United States Patent [19]
Mallory et al.

[11] Patent Number: 5,353,240
[45] Date of Patent: Oct. 4, 1994

[54] APPARATUS AND METHOD FOR AUTOMATICALLY TESTING COMPUTING EQUIPMENT

[75] Inventors: Joseph D. Mallory, Cedar Park; Bryan R. Franklin, Austin, both of Tex.

[73] Assignee: Dell USA, L.P., Austin, Tex.

[21] Appl. No.: 35,008

[22] Filed: Mar. 22, 1993

[51] Int. Cl.$^5$ ............................................. G06F 15/46
[52] U.S. Cl. .................... 364/552; 364/580; 324/73.1; 371/16.1
[58] Field of Search ............... 364/552, 579, 580, 483, 364/22.1; 324/73.1, 158 R; 371/16.1, 66

[56] References Cited

U.S. PATENT DOCUMENTS

| | | | |
|---|---|---|---|
| 4,275,451 | 6/1981 | Balzarini et al. | 364/552 |
| 4,586,179 | 4/1986 | Sirazi et al. | 364/482 |
| 5,157,270 | 10/1992 | Sakai | 371/66 |

OTHER PUBLICATIONS

Finn Jensen and Niels Petersen, Burn-In, 1982, pp. 75 & 81 publisher John Wiley & Sons.

*Primary Examiner*—Jack B. Harvey
*Assistant Examiner*—Craig Steven Miller
*Attorney, Agent, or Firm*—James Huffman; David Hitt

[57] ABSTRACT

A test apparatus and method for automatically testing computing equipment. The test apparatus comprises (1) a switch circuit, coupled to the computing equipment, capable of interrupting and restoring power to the computing equipment, (2) a timer, coupled to the switch circuit, capable of commanding the switch circuit to interrupt power to the computing equipment for a predetermined period of time and (3) a test circuit, coupled to the timer and the computing equipment, capable of determining when the switch circuit has restored power to the computing equipment and whether the computing equipment has successfully restarted following restoration of power. The test apparatus allows a laptop or desktop personal computer to be automatically boot tested, the apparatus having the capacity to display test status to remote users.

26 Claims, 6 Drawing Sheets

APPARATUS AND METHOD FOR AUTOMATICALLY TESTING COMPUTING EQUIPMENT

TECHNICAL FIELD OF THE INVENTION

This invention is directed, in general, to a test apparatus and method for automatically testing computing equipment and, more particularly, to such test apparatus and method which allows computing equipment under test to direct its own interruption of power and which provides a means by which the computing equipment under test can indicate successful completion of a test.

BACKGROUND OF THE INVENTION

During manufacturing of computers, it is necessary to conduct a series of tests on the computers to determine whether they are ready to ship.

In the past, once a computer had been fully assembled, it was loaded with diagnostic test software which functioned to check the various components and peripherals constituting the computer. This test software was able to use the computer's own processor to operate. Thus, a computer could use its own resources to perform a self-test; operation of the test software was automatic.

Within the general framework of testing components and peripherals, it is highly desirable to test whether a computer can successfully initialize itself following initial application of power (typically called "booting" or a "boot"). This is an especially important test because booting is not a trivial task for the computer. When a computer boots, it preferably puts itself through a series of self-diagnostic tests designed to check proper functioning of memory, ports and peripheral devices as a condition precedent to successful operation of the computer. These tests are usually stored in read-only memory within the computer. Because of the complexity inherent in booting, it is unacceptable to ship a computer from the factory which has not been tested to see whether it can boot itself properly.

Unfortunately, to boot a computer requires complete removal of all power from the computer and, following a period of total lack of power, restoration of the power to begin a boot. Unlike other tests and diagnostics, which can operate using the computer's own processor, a processor, once unplugged, cannot plug itself back in. In other words, a processor can order its own death but, once it has died, it no longer has power to order its own rebirth. Therefore, in the past, boot tests had to be performed with human intervention. Thus, a person had to physically turn power off to a computer and wait for a predetermined period of time to then restore power to the computer by physically turning it on.

To successfully perform a boot test, the computer would have to remain off for a predetermined period of time to assure full removal of power from all components and peripherals and, possibly, to assure that the computer had to cool to a certain temperature. Therefore, the human test operator had to accurately time how long the computer has remained off before restoring its power. As with other processes requiring human intervention, this prior art method of testing resulted in errors in timing due to a human operator's lack of attention to the process. Occasionally, these errors might result in the computer's appearing to successfully complete a boot test which, had the boot test been properly performed, the computer should have failed. In today's environment of tight quality control, this is unacceptable. Furthermore, due to these varying periods of off time, a computer may be without power for too long a time. While this may not prejudice the test being performed, it nonetheless results in inefficiencies in the testing process because the testing process would take longer than it should.

Finally, it is expensive and boring for human operators to flip switches on computers all day long. This is so even if the above-noted deficiencies in human operation of the test were ignored.

Therefore, it is apparent that there is a need in the field of computer boot testing to provide an automatic computer boot testing apparatus and method to thereby allow a computer being tested to order its own power to be turned off and, following a precisely gauged period of time, have its power turned back on to determine whether it has properly booted itself.

SUMMARY OF THE INVENTION

To overcome the above-noted deficiencies in the prior art, it is a primary object of the present invention to provide a testing apparatus for either desktop or laptop personal computers which can temporarily couple to the computer via one or more existing ports on the computer, can conduct a boot test on the computer to assure that the computer can, in fact, successfully restart following complete loss of power and can indicate whether the computer has passed or failed to an operator who may be somewhat distant from the testing apparatus.

Accordingly, to address the above-mentioned primary object, the present invention provides a test apparatus for computing equipment comprising (1) a switch circuit, coupled to the computing equipment, capable of interrupting and restoring power to the computing equipment, (2) a timer, coupled to the switch circuit, capable of commanding the switch circuit interrupt power to the computing equipment for a predetermined period of time and (3) a test circuit, coupled to the timer and the computing equipment, capable of determining when the switch circuit has restored power to the computing equipment and whether the computing equipment has successfully restarted following restoration of power. The test apparatus further comprises a power supply coupled to the switch circuit capable of supplying power to the computing equipment via the switch circuit.

The test apparatus receives a condition signal from the computing equipment, the condition signal representing whether the computing equipment has successfully restarted following restoration of power. The switch circuit, the timer and the test circuit are detachably coupled to the computing equipment and, in the preferred embodiment of the present invention, to a keyboard port on the computing equipment.

The test circuit is capable of determining whether the computing equipment has taken longer than a predetermined maximum period of time to successfully restart. Obviously, there are many ways a test apparatus can determine whether the computing equipment has successfully restarted. Most often it does so by making observations, typically by monitoring electronic signals (typically issuing directly from the computing equipment). Therefore, it is another object of the present invention to provide a circuit for receiving a condition signal from the computing equipment, the condition signal representing a condition of the computing equipment following the passage of the period of time. The condition signal indicates whether the computing equipment has successfully restarted following the passage of the period of time.

In a preferred embodiment of the present invention, the computing equipment, which is under test, should order its own removal of power. Accordingly, it is still another object of the present invention to provide a circuit capable of receiving a start signal from the computing equipment, the start signal representing a command to the test apparatus to begin the period of time.

Once the testing has completed, it is desirable to provide some means of notification as to whether the test has been performed successfully or whether the computing equipment has failed to completely reboot. Therefore, yet another object of the present invention is to provide a display capable of displaying whether the computing equipment has successfully restarted following the passage of the period of time. This means for displaying can range from a simple plurality of light emitting diodes to a cathode ray tube-based display.

Under some circumstances, computing equipment may so utterly fail a reboot test so as to be unable to indicate anything to the test apparatus concerning its condition. Therefore, the test apparatus should be able to determine that the computing equipment has failed the boot test if computer has failed to respond within a certain period of time ("time-out"). Therefore, yet another object of the present invention is to provide a test apparatus wherein the timer is capable of determining whether the computing equipment has taken longer than a predetermined maximum period of time to successfully restart.

The present invention also addresses the above-mentioned primary object by providing a method of testing computing equipment, comprising the steps of (1) storing in memory a time signal received from the computing equipment, the time signal representing a period of time of temporary power interruption appropriate for the computing equipment, (2) counting the period of time by the processor, (3) temporarily interrupting power to the computing equipment for the period of time and (4) determining whether the computing equipment has successfully restarted following passage of the period of time.

In the preferred embodiment, the method further comprises the step of receiving a condition signal from the computing equipment via one of the input ports, the condition signal representing a condition of the computing equipment following the passage of the period of time, and the condition signal indicating whether the computing equipment has successfully restarted following passage of the period of time.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that the conception and the specific embodiment disclosed may be readily used as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF DRAWINGS

For a complete understanding of the present invention, reference is now made to the following descriptions taken in conjunction with the accompanying diagrams, in which.

DETAILED DESCRIPTION OF THE INVENTION

Figure 1:
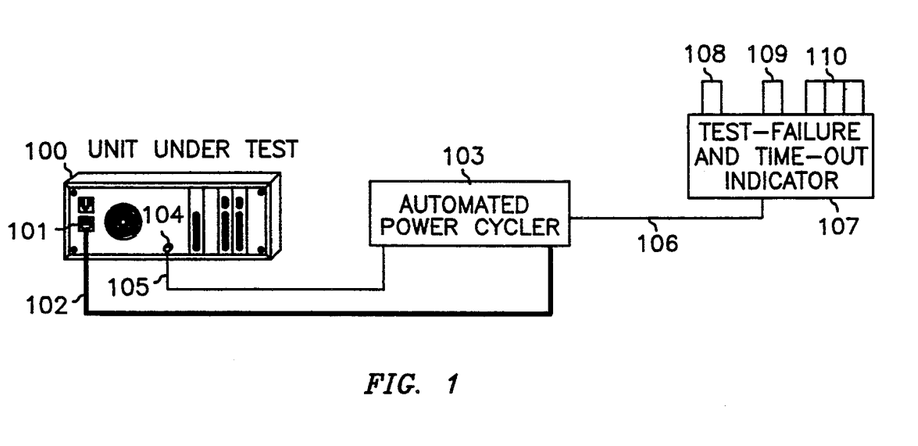
FIG. 1 illustrates a top-level block diagram of a preferred embodiment of the test apparatus of the present invention.

FIG. 1 illustrates a top-level block diagram of a preferred embodiment of the test apparatus of the present invention. A unit under test ("UUT") 100 is comprised of computing equipment (and, in the preferred environment of the present invention, is a laptop or desktop personal computer) presently being tested. The test apparatus of the present invention is, as shown in FIG. 1, divided into two parts: an automated power cycler 103 and a test-failure and time-out indicator 107. Automated power cycler 103 is connected to a keyboard port 104 and a power receptacle 101 of the UUT 100 via lines 105 and 102, respectively. Automated power cycler 103 controls power to the UUT via line 102. Automated power cycler 103 and the UUT 100 communicate through the keyboard port 104 of the UUT 100 via line 105. Test-failure and time-out indicator 107 is used to display certain status messages, for example: whether testing on the UUT 100 is currently in progress, whether the UUT 100 needs attention, or whether the UUT 100 has passed, failed or timed out. These statuses are shown by attention light 108, in progress LED 109 or pass, fail, or time-out indicators 110. Automated power cycler 103 determines which status should be displayed and communicates via line 106 with the test-failure and time-out indicator 107. Attention light 108 allows an operator to monitor test progress from a remote location; light 108 shines relatively brightly so as to be viewable from a substantial distance. Automated power cycler 103 contains a switch circuit, a power supply and a timer (not shown in FIG. 1). Test-failure and time-out indicator 107 contains test circuitry (also not shown in FIG. 1) to determine whenever the UUT 100 has succeeded or failed in its attempt to restart following restoration of power by the switch circuit.

Figure 2:
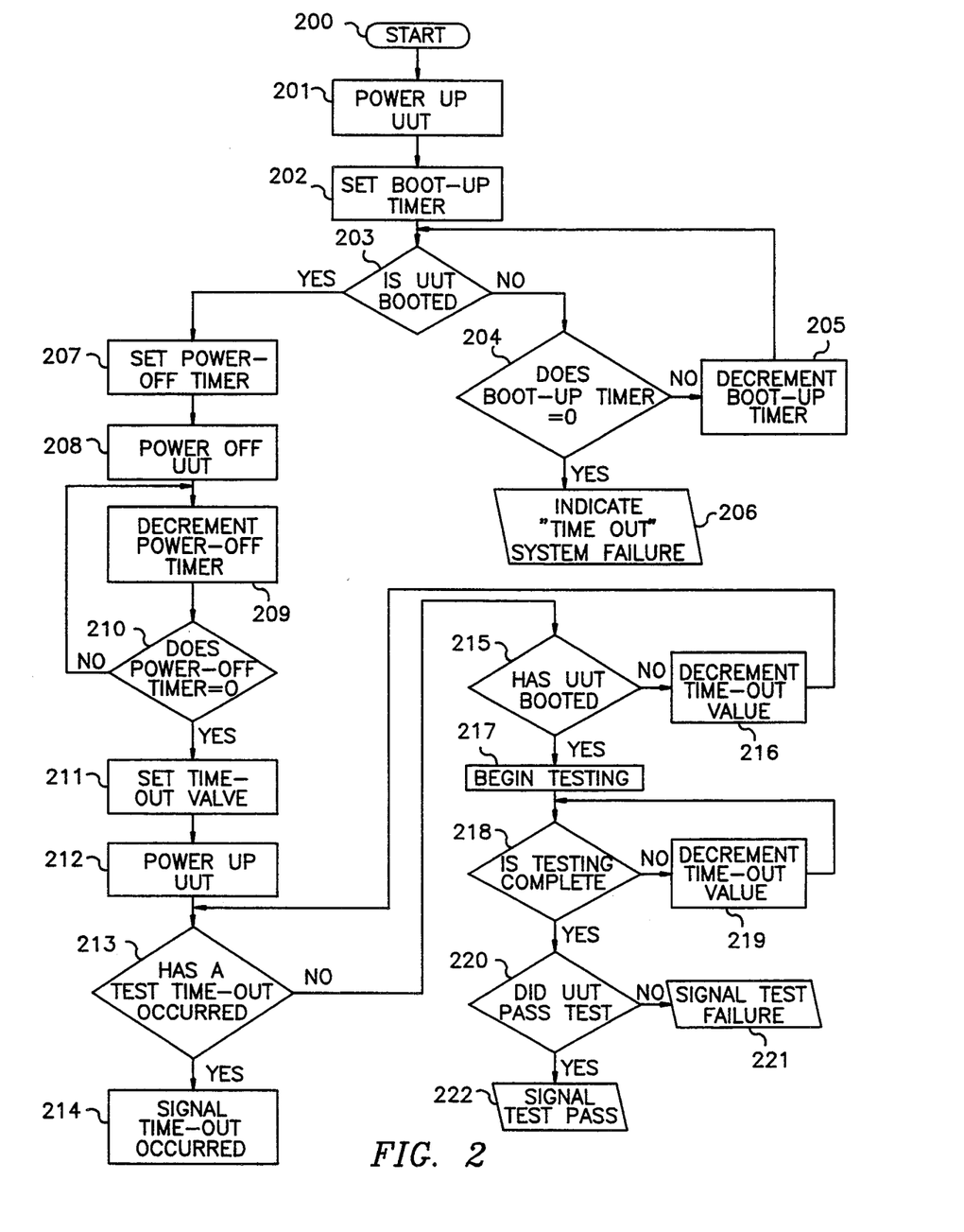
FIG. 2 illustrates a flow diagram of the method embodying the present invention.

Turning now to FIG. 2, illustrated is a flow diagram of the method embodying the present invention. The flow diagram begins at start block 200. The first step is to initially apply power to the UUT. This is done at block 201. The automated power cycler sets a boot-up timer in a block 202. The next step is to periodically determine whether the UUT has booted. This step is performed in decision block 203. If the UUT has not booted, the automated power cycler checks to see if the boot-up timer has equaled zero in a decision block 204. If yes, the automated power cycler requests that the test-failure and time-out indicator display that a "time out" system failure has occurred in a block 206. If the boot-up timer does not equal zero, the automated power cycler decrements the boot-up timer by one unit in a block 205.

Next, the system cycles back to determine whether the UUT has booted in the decision block 203. If the UUT has booted, the automated power cycler sets a power-off timer in a block 207, and it then turns power to the UUT off in a block 208. The power-off timer then decrements by 1 unit in block 209. The automated power cycler checks to determine whether the power-off timer is equal to zero in a decision block 210. If not, the system cycles back to decrement the power-off timer in a block 209. If the power-off timer is equal to zero, the automated power cycler sets the time-out value in a block 211 and powers up the UUT in a block 212.

Then the automated power cycler determines whether a test time-out has occurred in a decision block 213. If so, then the automated power cycler signals the test-failure and time-out indicator to display that a test time-out has occurred in a block 214. If a test-time out has not occurred, as determined in decision block 213, then the automated power cycler determines whether the UUT has properly booted in a decision block 215. If it has not, the automated power cycler will decrement the time-out value in a block 216 and cycle back to determine whether the test time-out has occurred in decision block 213.

If the UUT has booted, the automated power cycler will signal to begin testing in a block 217. The automated power cycler will then determine whether testing is complete in a decision block 218. If it is not, it will decrement the time out value in a block 219 and cycle back to determine whether the testing is complete in decision block 218. When this testing is complete, the automated power cycler will determine whether the UUT has passed the test in a decision block 220. If the UUT has passed its test, as decided in a block 220, the automated power cycler will signal the test-failure and time-out indicator to signal test pass in a block 222. If the UUT did not pass the test, as determined in decision block 220, the automated power cycler will signal the test failure and time out indicator to signal a test failure in a block 221.

Figure 3:
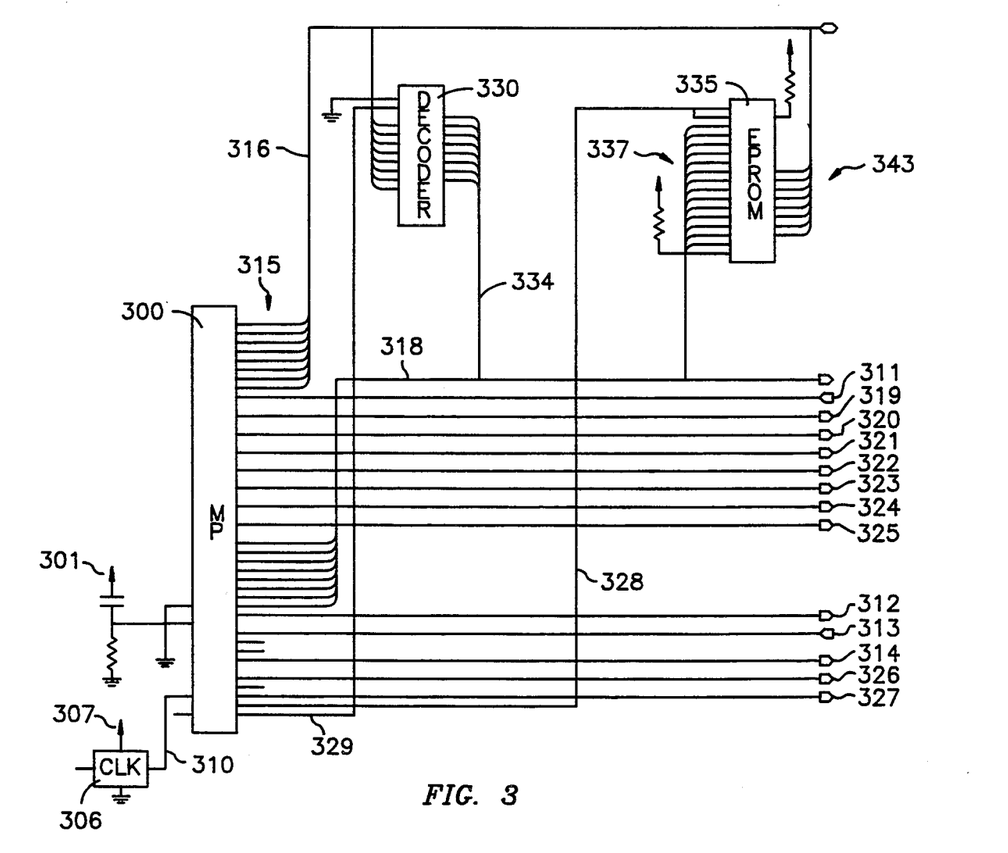
FIG. 3 illustrates a schematic diagram of a portion of the test apparatus of the present invention.

Turning now to FIG. 3, illustrated is a schematic diagram of a portion of the test apparatus of the present invention. In its preferred embodiment, the test apparatus is microprocessor-driven. This is represented in FIG. 3 by a microprocessor 300, which, in the preferred embodiment, is an Intel 8051 microprocessor, although use of other microprocessors is well within the scope of the present invention. The microprocessor 300 controls the automated power cycler and the interface between the microprocessor 300 and the UUT (not shown in FIG. 3, but coupled in a manner which will be later explained), such that the automated power cycler appears to the UUT to be a keyboard. Microprocessor 300 receives power from a 5 volt input 301. This input carries power from a power supply circuit illustrated in FIG. 4 in a manner which will be described in connection therewith. Clock 306 is powered by a 5 volt input 307 (also from the power supply circuit in FIG. 4) and connected via line 310 to the microprocessor 300 to drive the microprocessor 300.

Keyboard clock line 311 is an input line to the microprocessor 300 and carries a signal representing a keyboard strobing clock for purposes of synchronization. Keyboard data line 312 is also an input line to the microprocessor 300 and operates in conjunction with keyboard clock line 311 to deliver data to the microprocessor through the keyboard port of the UUT. These will be described later in connection with FIG. 5.

Start indicator line 313 is also an input line and is connected to the microprocessor 300. Start indicator line 313 receives a signal from a circuit illustrated in FIG. 6 in a manner to be explained later. UUT power indicator line 314, another input line, is also connected to the microprocessor 300. UUT power indicator line 314 will also be discussed in connection with FIG. 5.

Data lines 315 join together in a data bus 316 and connect the microprocessor 300 with a data/address decoder 330, the purpose of which is to multiplex data and address signals travelling to and from microprocessor 300. As is evident in FIG. 3, address lines 334 leave the data/address decoder 330 and join together with address bus 318. This bus 318 joins with the microprocessor 300 to allow address communication therewith.

Attention indicator line 319 is connected to microprocessor 300 and is an output line used to drive a circuit illustrated in FIG. 8 in a manner which will be described in connection therewith. Time-out line 320, test fail indicator line 322 and test pass indicator line 323 all leave microprocessor 300. These lines 320, 322, 323, along with testing line 326, provide power to light emitting diodes ("LED"s) in a manner which will be described later in connection with FIG. 9. Power line 321 leaves microprocessor 300 to provide a signal to a circuit illustrated in FIG. 7.

Keyboard data out line 324 and keyboard clock out line 325 are connected to microprocessor 300 and are used to communicate data from the microprocessor 300 to the UUT through its keyboard port. These lines 324, 325, along with previously described keyboard clock in and keyboard data in lines 311, 312, interact with the circuit illustrated in FIG. 5 in a manner which will be described. Read line 327 allows the microprocessor to address externally-configurable switches used to configure the test apparatus in a manner which will be described in connection with FIG. 10. Lines 328 and 329 route clock signals from microprocessor 300 to the data/address decoder 330 and a memory device 335 which, in the preferred embodiment of the present invention, is an erasable, programmable read-only memory ("EPROM").

EPROM 335 is connected to data bus 316 through lines 343. EPROM 335 is further connected to address bus 318 via lines 337.

Figure 4:
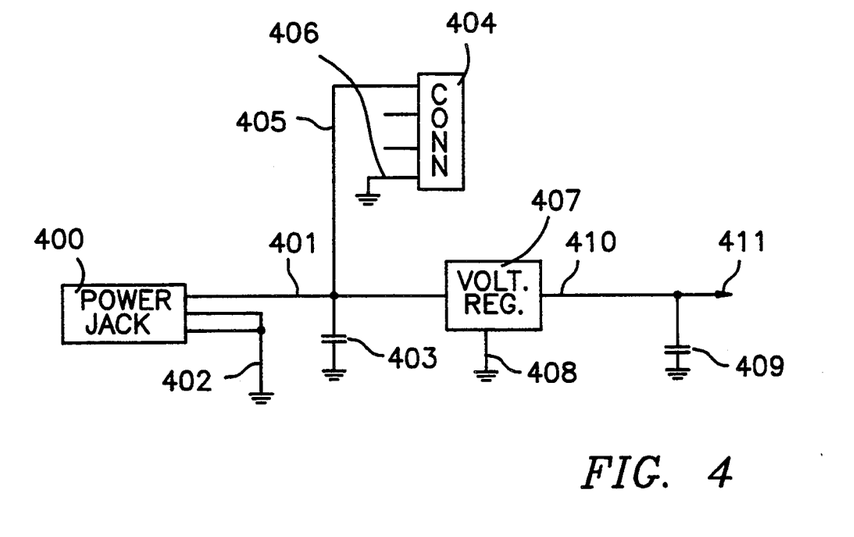
FIG. 4 illustrates a schematic diagram of a power supply for the testing apparatus of the present invention.

Turning now to FIG. 4, illustrated is a schematic diagram of a power supply for the testing apparatus of the present invention. Line power is delivered to the power supply via a power jack 400, grounded at line 402. Line 401, carrying a positive voltage, is connected to a voltage regulator 407. Line 401 is coupled via capacitor 403 to ground. Tap 405 pulls the positive voltage from line 401 to a connector 404. Connector 404 further includes a grounded line 406.

The test apparatus of the present invention is designed to operate in conjunction with both desktop and laptop personal computers. When used in conjunction with desktop computers, the test apparatus is adapted to switch, via the circuit illustrated in FIG. 7, 120 volt power required to power the desktop computer. On the other hand, when used in conjunction with a laptop computer, the test apparatus can supply power directly to the laptop computer, rather than merely switch power delivered from another, separate power source. This is the purpose behind connector 404.

Regulator 407 is grounded via line 408 and provides its output via line 410. Output from regulator 407 is smoothed via capacitor 409. Power supply output 410 is coupled via line 411 to microprocessor 300 and clock 306 via lines 301, 307, respectively.

Figure 5:
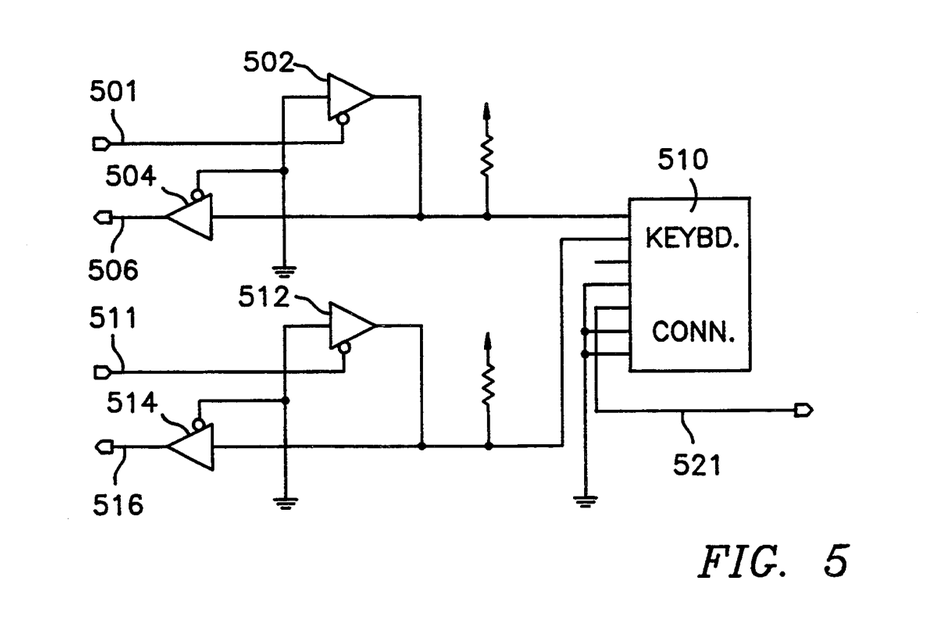
FIG. 5 illustrates a schematic diagram of an interface circuit connecting the test apparatus and the UUT.

Turning now to FIG. 5, illustrated is a schematic diagram of an interface circuit connecting the test apparatus and the UUT, providing communication through the keyboard port of the UUT in the preferred embodiment of the invention. The interface circuit receives keyboard clock and data input and output lines 311, 312, 324, 325 (all of FIG. 3) via lines 501, 506, 511, 516, respectively. Open collector devices 502, 504, 512, 514, allow the microprocessor and the UUT to drive the interface circuit simultaneously. If the microprocessor and the UUT attempt to simultaneously drive the lines 311, 312, 324, 325, harm will come to the interface circuit, the microprocessor or the UUT, by virtue of the open collector devices 502, 504, 512, 514. This would not be the case were the open collector devices 502, 504, 512, 514 not present.

The keyboard clock and data lines are delivered to a keyboard interface connector 510, which, in the preferred embodiment of the present invention, is designed to be attached and removed from the UUT keyboard port without permanently affecting the UUT. Again, the test apparatus has been designed to appear to the UUT to be nothing more than a standard keyboard input device. This eliminates a need to load special test apparatus driver software in the UUT. Finally, connector 510 provides a UUT power line 521 which is output to the microprocessor 300 of FIG. 3 via UUT power indicator line 314.

Figure 6:
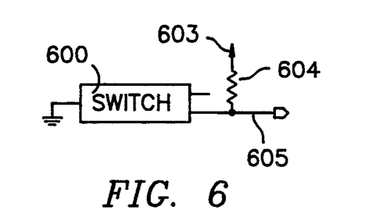
FIG. 6 illustrates a start trigger circuit.

Turning now to FIG. 6, illustrated is a start trigger circuit, which enables operation of the test apparatus of the present invention. The start trigger circuit provides a single start output line 605, which is connected to start line 313 of FIG. 3. Start output line 605 is usually high by virtue of its connection to a voltage source 603 through resistor 604. However, when momentary switch 600 is depressed, start output line 605 is momentarily grounded, signaling the microprocessor to start operation.

Figure 7:
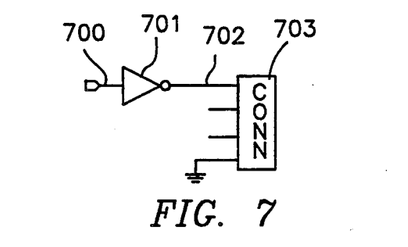
FIG. 7 illustrates a schematic diagram of a relay circuit.

Turning now to FIG. 7, illustrated is a schematic diagram of a relay circuit. As may be recalled, connector 404 is used to provide power to laptop computers, which run on comparatively small voltages. When desktop computers are under test, they must be supplied full 120 volt line power. This is done by connecting the computer to an external source of power via a relay, the test apparatus switching the power with a relay. This is the purpose of the relay circuit shown in FIG. 7. The relay circuit comprises a power line input 700, which is coupled to the power line 321 of FIG. 3. The signal on the power line input 700 is inverted in inverter 701 and supplied, via line 702 to a connector 703, enabling the circuit to power a solid state relay, used to switch line current supplied to the desktop UUT.

Figure 8:
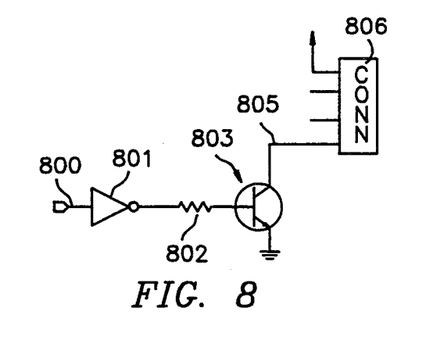
FIG. 8 illustrates a schematic diagram of an attention light driver circuit.

Turning now to FIG. 8, illustrated is a schematic diagram of an attention light driver circuit. The circuit receives a signal via attention input line 800, which is coupled to attention indicator line 319 of FIG. 3. The signal is inverted by inverter 801 and delivered, through resistor 802, to transistor switch 803, the purpose of which is to switch relatively high voltage power supplied to the attention light to cause it to shine brightly. Power is delivered to the attention light (not shown) via line 805 to connector 806. The purpose of the attention light driver circuit is to allow users to monitor operation of the test apparatus from a distance. An attention light 108 is mounted on the test failure and time out indicator 107, both of FIG. 1, as previously described. The light shines brightly so as to be viewable from a substantial distance. The attention light can be made to blink or to shine steadily so as to relay various messages to the remote user, all under control of the microprocessor 300.

Figure 9:
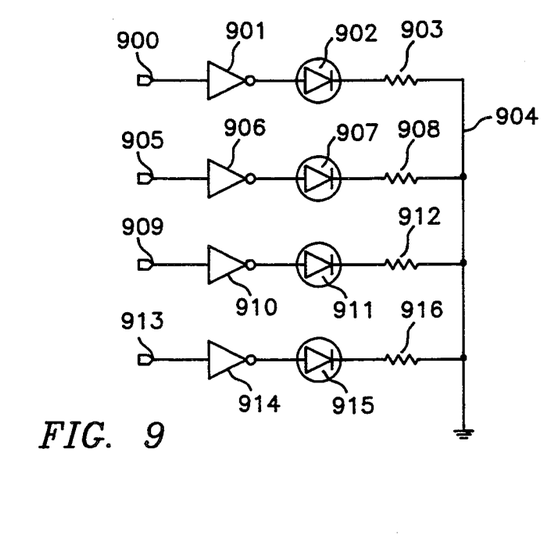
FIG. 9 illustrates a schematic diagram of the LED display circuit for the test apparatus of the present invention.

Turning now to FIG. 9, illustrated is a schematic diagram of the LED display circuit for the test apparatus of the present invention. Time out input line 900, test fail input line 905, test pass input line 909 and testing input line 913 are coupled, respectively, to time-out line 320, test fail indicator line 322, test pass indicator line 323 and testing line 326, all of FIG. 3 to thereby allow individuals LEDs within the LED display circuit to indicate conditions or statuses to an operator. Respective signals are inverted by inverters 901, 906, 910, 914 and supplied to respective LEDs 902, 907, 911, 915. Resistors 903, 908, 912, 916 control current flow to a ground 904 to complete the circuit.

Figure 10:
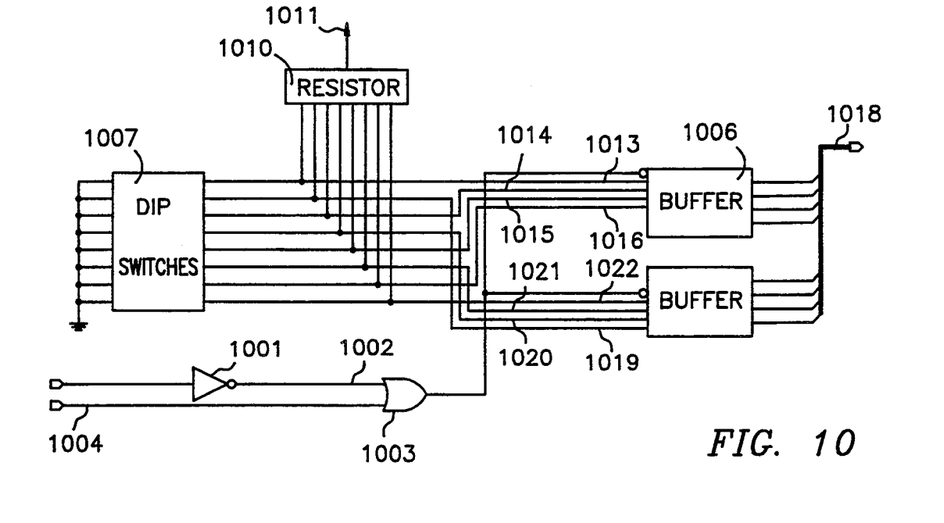
FIG. 10 illustrates a schematic diagram of a dual inline package ("DIP") switch circuit.

Turning now to FIG. 10, illustrated is a schematic diagram of a dual inline package ("DIP") switch circuit, which allows selectable configuration of the test apparatus. The circuit comprises address decoder circuitry which allows the microprocessor 300 of FIG. 3 to address the switches to read their settings. The microprocessor 300 selects the switches by providing line 15 of its address bus (318 of FIG. 1) to an inverter 1001. This address signal from line 15 is delivered via line 1002 along with a read signal, delivered via read line 327 of FIG. 3 and line 1004, to an OR gate 1003, which, in turn, causes buffers 1006 to latch the configuration of DIP switches 1007, delivered along individual data lines 1013, 1014, 1015, 1016, 1019, 1020, 1021, 1022. A resistor pack 1010, coupled to a voltage source 1011, allows the DIP switches to switch the voltage source 1011. Data indicated by the DIP switches is supplied to the microprocessor 300 via data bus 1018, which couples to data bus 316 of FIG. 3.

Figure 11:
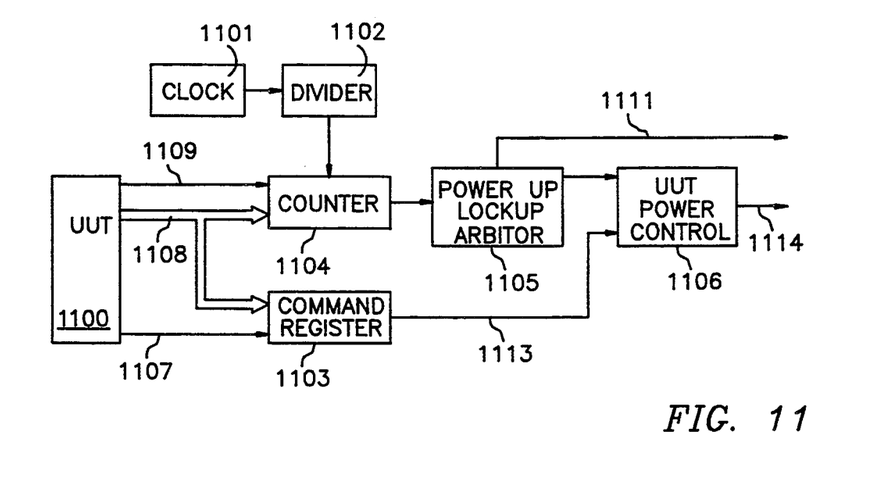
FIG. 11 is an alternative embodiment of the test apparatus of the present invention.

Turning now to FIG. 11, illustrated is an alternative embodiment of the test apparatus of the present invention. While not the preferred embodiment, this discrete digital embodiment is nonetheless fully functional. In this embodiment, the UUT 1100 is connected via line 1107 to a command register 1103. The command register 1103 is connected via line 1113 to UUT power control 1106. UUT 1100 is connected via line 1109 to counter 1104. Timing is controlled by clock 1101 and clock pulse divider 1102. Clock 1101 is preferably a crystal oscillator producing a frequency of 32.768 kHz crystal oscillator whose signal is divided by 1,966,080 by the clock pulse divider 1102 to generate signal having a period of one minute. Output from the clock pulse divider 1102 is provided to counter 1104. The UUT 1100 provides a power-down time to the counter 1104 and a power-down command to the command register 1103 via data bus 1108. A power-up lockup arbitor 1105 decides whether the UUT has locked-up (or timed-out). Output from the power-up lockup arbitor is provided via line 1111 to status indicators (not shown) and to UUT power control 1106, which, in conjunction with signals received via line 1113 from the command register 1103, controls application of power to the UUT via line 1114.

Although the present invention and its advantages have been described in detail, it should be understood that various changes, substitutions and alterations can be made herein without departing from the spirit and scope of the invention as defined by the appended claims.

What is claimed is:

1. A test apparatus for testing computing equipment, comprising:
   a switch circuit, coupled to said computing equipment, for interrupting and restoring power to said computing equipment;
   a timer, coupled to said switch circuit, for commanding said switch circuit to interrupt power to said computing equipment for a predetermined period of time in response to a control signal asserted by said computing equipment and for causing said switch circuit to restore power to said computing equipment following said predetermined period of time; and
   a test circuit, coupled to said timer and said computing equipment, for determining when said switch circuit has restored power to said computing equipment and whether said computing equipment has successfully restarted following restoration of power.

2. The test apparatus as recited in claim 1 wherein said test circuit receives a condition signal from said computing equipment, said condition signal representing whether said computing equipment has successfully restarted following restoration of power.

3. The test apparatus as recited in claim 1 wherein said switch circuit, said timer and said test circuit are detachably coupled to said computing equipment.

4. The test apparatus as recited in claim 1 wherein said switch circuit, said timer and said test circuit detachably couple to a keyboard port on said computing equipment.

5. The test apparatus as recited in claim 1 further comprising a power supply coupled to said switch circuit for supplying power to said computing equipment via said switch circuit.

6. The test apparatus as recited in claim 1 wherein said test circuit is for determining whether said computing equipment has taken longer than a predetermined maximum period of time to successfully restart.

7. The test apparatus as recited in claim 1 further comprising means for receiving a condition signal from said computing equipment, said condition signal representing a condition of said computing equipment following said passage of said period of time.

8. The test apparatus as recited in claim 7 wherein said condition signal indicates whether said computing equipment successfully restarted following said passage of said period of time.

9. A test apparatus for computing equipment, comprising:
   means for storing in memory a time signal representing a period of time of temporary power interruption appropriate for said computing equipment;
   means, under control of a processor, for temporarily interrupting power to said computing equipment for said period of time in response to a control signal asserted by said computing equipment and for restoring power to said computing equipment following said period of time; and
   means for determining whether said computing equipment has successfully restarted following passage of said period of time.

10. The test apparatus as recited in claim 9 further comprising means for displaying whether said computing equipment has successfully restarted following said passage of said period of time.

11. The test apparatus as recited in claim 9 further comprising detachable means for coupling said test apparatus to said computing equipment.

12. The test apparatus as recited in claim 11 wherein said detachable coupling means attaches to a keyboard port on said computing equipment.

13. The test apparatus as recited in claim 9 further comprising switchable means for supplying power to said computing equipment.

14. The test apparatus as recited in claim 9 further comprising means for determining whether said computing equipment has taken longer than a predetermined maximum period of time to successfully restart.

15. A method of testing computing equipment comprising the steps of:
   storing in memory a time signal representing a period of time of temporary power interruption appropriate for said computing equipment;
   counting said period of time with a processor;
   receiving a control signal from said computing equipment, said control signal representing a command to said processor to begin counting said period of time;
   temporarily interrupting power to said computing equipment for said period of time; and
   determining whether said computing equipment has successfully restarted following passage of said period of time.

16. The method of testing as recited in claim 15 further comprising the step of receiving a condition signal from said computing equipment, said condition signal representing a condition of said computing equipment following said passage of said period of time.

17. The method of testing as recited in claim 16 wherein said condition signal indicates whether said computing equipment has successfully restarted following said passage of said period of time.

18. The method of testing as recited in claim 15 further comprising the step of displaying whether said computing equipment has successfully restarted following said passage of said period of time.

19. The method of testing as recited in claim 15 further comprising the step of detachably coupling a test apparatus performing said method of testing to said computing equipment.

20. The method of testing as recited in claim 19 wherein said step of detachably coupling comprises the step of attaching said test apparatus to a keyboard port on said computing equipment.

21. The method of testing as recited in claim 15 further comprising the step of switchably supplying power to said computing equipment.

22. The method of testing as recited in claim 15 further comprising the step of determining whether said computing equipment has taken longer than a predetermined maximum period of time to successfully restart.

23. A system for testing a personal computer, comprising:
- a switch circuit for coupling a power supply to said personal computer and for interrupting and restoring power to said personal computer;
- a timer, coupled to said switch circuit, for commanding an interruption of power to said personal computer and, following passage of a predetermined period of time, for commanding a restoration of power to said personal computer;
- a test circuit, coupled to said timer and said personal computer, for determining when said switch circuit has restored power to said personal computer and whether said personal computer has successfully restarted following restoration of power, said test circuit receiving a condition signal from said personal computer, said condition signal representing whether said personal computer has successfully restarted following restoration of power, said test circuit further for determining whether said personal computer has taken longer than a predetermined maximum period of time to successfully restart, and wherein said test circuit is detachably coupled to a keyboard port of said personal computer; and
- a display, coupled to said test circuit, for indicating to an operator whether said personal computer has succeeded in restarting or has failed to restart.

24. The system as recited in claim 23 wherein said personal computer is a laptop personal computer.

25. A system for testing computing equipment, comprising:
- a test apparatus including memory, an input port, an output port, and a processor coupled to said memory, said input port, and said output port;
- means for coupling said input and output ports to said computing equipment via a port on said computing equipment, wherein said test apparatus further includes:
- means for switchably providing power from said test apparatus to said computing equipment via said output port;
- means for storing in said memory a time signal received from said computing equipment via said input port, said time signal representing a period of time of temporary power interruption appropriate for said computing equipment;
- means, under control of said processor, for temporarily disconnecting power to said computing equipment for said period of time;
- means for restoring said power to said computing equipment following passage of said period of time; and
- means, under control of said processor, for determining and displaying whether said computing equipment has successfully restarted following passage of said period of time.

26. The system as recited in claim 25 further comprising means for receiving a condition signal from said computing equipment via one of said input ports, said condition signal representing a condition of said computing equipment following said passage of said period of time, said condition signal indicating whether said computing equipment has successfully restarted following passage of said period of time.

* * * * *